United States Patent [19]

Kasagi et al.

[11] Patent Number: 4,514,664
[45] Date of Patent: Apr. 30, 1985

[54] COLOR TELEVISION RECEIVER

[75] Inventors: Kunisuke Kasagi; Machio Kawashima, both of Mobara, Japan

[73] Assignee: Hitachi, Ltd., Tokyo, Japan

[21] Appl. No.: 376,662

[22] Filed: May 10, 1982

[30] Foreign Application Priority Data

May 13, 1981 [JP] Japan .................................. 56-70718

[51] Int. Cl.³ ...................... H01J 29/52; H04N 9/535
[52] U.S. Cl. ........................................ 315/383; 358/29
[58] Field of Search ................. 315/383, 370; 358/29, 358/34, 219

[56] References Cited

U.S. PATENT DOCUMENTS 4,149,110 4/1979 Dallos ................................. 358/219
4,370,674 1/1983 Johnson et al. ....................... 358/29

FOREIGN PATENT DOCUMENTS 4443579 4/1979 Japan .

Primary Examiner—Theodore M. Blum
Assistant Examiner—Gregory Issing
Attorney, Agent, or Firm—Charles E. Pfund

[57] ABSTRACT

A color television receiver includes a color picture tube having three electron guns including cathodes and heaters therefor, respectively, and an automatic cutoff adjusting circuit for adding a reference voltage signal substantially at a black level to a luminance signal during an interval beginning substantially at the end of a vertical blanking period, and for detecting cathode currents flowing toward the cathodes during the above-described interval to control cathode voltages for the cathodes for keeping the cathode currents at a predetermined level by way of feedback of voltages proportional to the cathode currents. There is provided a circuit for applying a positive voltage to each of the heaters during the above-described interval to reduce a potential difference between the heater and corresponding one of the cathodes to thereby lower a leakage current flowing between the cathode and the heater.

3 Claims, 13 Drawing Figures

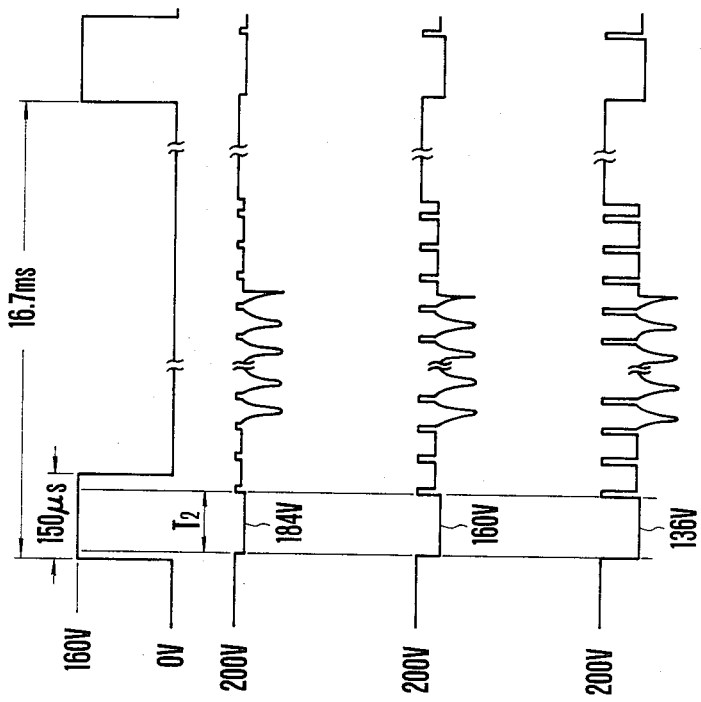
F I G. 5a
F I G. 5b
F I G. 5c
F I G. 5d

4,514,664

COLOR TELEVISION RECEIVER

BACKGROUND OF THE INVENTION

The present invention relates to a color television receiver having an automatic cathode cutoff-voltage adjusting circuit for a color picture tube.

Color television receivers demodulate received video signals into video signals of three primary colors, red, green, and blue and supply the R, G, and B video signals respectively to the cathodes of a color picture tube to control electron beams from the cathodes which bombard phosphors of different colors on a fluorescent screen to enable the phosphors to emit proper amounts of red, green, and blue light, so that a colored picture image will be reproduced which has been transmitted from a transmitting station. A desired shade of color, including white, can thus be reproduced by additive color mixture of the three primary colors, red, green, and blue. When it is desired to reproduce white on the fluorescent screen, the image which should look white is tinted and all other colors on the screen become diferent from those which should appear on the screen if the three primary colors are mixed at a ratio which is different from that for forming white. Under these conditions, the quality of a reproduced color image is degraded.

To eliminate the foregoing problem, it is necessary to enable the three electron guns to operate under constant conditions at all times. However, the electron guns have different cathode cutoff voltages mainly because of irregularity in manufacture and besides, these voltages tend to vary with time while in use, resulting in different mixture ratios for the three colors. There has been proposed in, for example, Japanese Preliminary Patent Publication No. 44435/79 an automatic cutoff adjusting circuit for varying the voltages of video signals supplied to the cathodes of a color picture tube in response to changes in the cathode cutoff voltages. The proposed automatic cutoff adjusting circuit, however, is disadvantageous in that the color mixture ratios are liable to change due to leakage currents flowing between the cathodes and the heaters therefor.

SUMMARY OF THE INVENTION

It is an object of the present invention to provide a color television receiver for reproducing proper color images on a color picture tube in which leakage currents flow between the cathodes and their heaters.

Another object of the present invention is to provide a color television receiver having a circuit for applying positive biasing voltages to heaters for the cathodes of a color picture tube during an interval in which a reference voltage signal is added to a luminance signal.

According to the present invention, a color television receiver includes a color picture tube having three electron guns including cathodes and heaters therefor, respectively, and an automatic cutoff adjusting circuit for adding a reference voltage signal substantially at a black level to a luminance signal during an interval beginning substantially at the end of a vertical deflection blanking period, and for detecting cathode currents during said interval to control cathode voltages for keeping the cathode currents at a predetermined level by way of feedback of voltage proportional to the cathode currents. The color television receiver also includes a circuit for applying a positive biasing voltage to each of the heaters during said interval to reduce a potential difference between the heater and corresponding one of the cathodes to thereby lower a leakage current flowing between the cathode and the heater.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 5a through 5d are illustrative of the waveforms of signals generated in a color television receiver according to the present invention;

DETAILED DESCRIPTION OF PREFERRED EMBODIMENT

Figure 1:
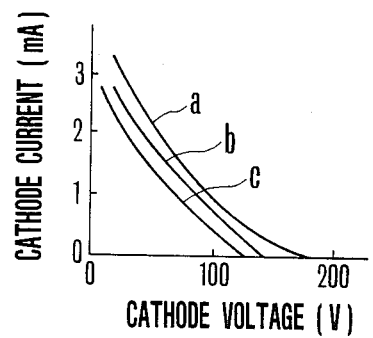
FIG. 1 is a graph showing relationships between cathode voltages and cathode currents in a color picture tube.

FIG. 1 shows cathode-voltage vs. cathode-current characteristics curves for the electron guns in a color picture tube. The curves a, b, and c show characteristics, respectively, of the red, green, and blue electron guns. The cathode voltages at which the cathode currents fall to zero, that is, cathode cutoff voltages, vary from one electron gun to another mainly because of irregurality in manufacture. The cathode cutoff voltages also changes with time while the electron guns are in use. Under these conditions, the ratio at which the three primary colors are mixed together is changed and the mixed resultant color differs from what should be formed.

To cope with such a problem, there has been proposed an automatic cutoff adjusting circuit for varying the voltages of video signals supplied to the cathodes of a color picture tube in response to changes in the cathode cutoff voltages.

Figure 2:
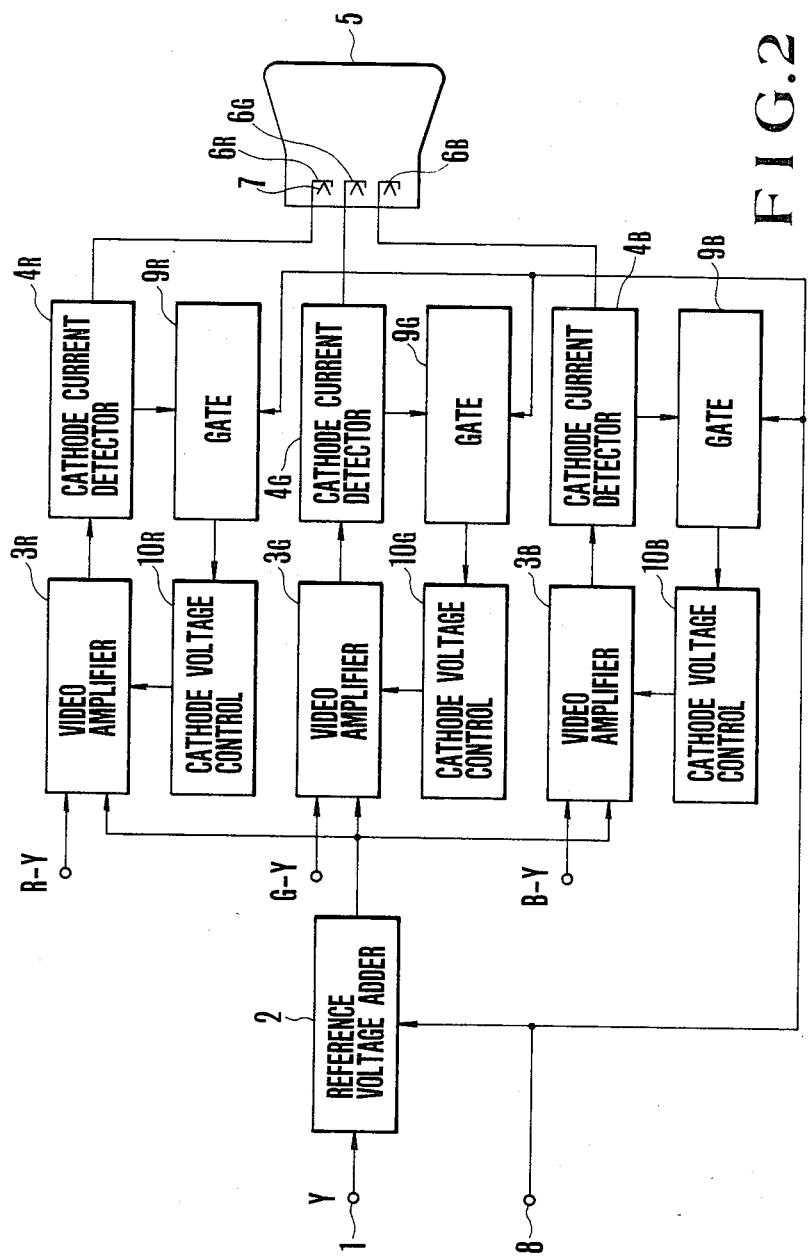
FIG. 2 is a block diagram of an automatic cathode cutoff voltage adjusting circuit.

FIG. 2 illustrates such an automatic cutoff adjusting circuit as will be seen from the aforementioned publication. A luminance signal supplied to an input terminal 1 is delivered via a reference voltage adder 2 to video amplifiers $3_R$, $3_G$, $3_B$ for three colors in which color difference signals are added to the luminance signal to produce video signals. The video signals are fed via cathode current detectors $4_R$, $4_G$, $4_B$ to cathodes $6_R$, $6_G$, $6_B$, respectively, of electron guns in a color picture tube 5. The cathodes $6_R$, $6_G$, $6_B$ are heated respectively by heaters 7.

A pulse signal which is applied to another input terminal 8 is in synchronism with a period in which the reference voltage signal is supplied. The pulse signal is delivered to the reference voltage adder 2 and gates $9_R$, $9_G$, $9_B$ for the three colors. Designated at $10_R$, $10_G$, $10_B$ are cathode voltage controllers.

In operation, the reference voltage signal is added to the luminance signal by the reference voltage adder 2 in response to the pulse signal supplied from the input terminal 8 during an interval beginning substantially at the end of a vertical blanking period. The luminance signal with the reference voltage signal thus added is converted by the video amplifiers $3_R$, $3_G$, $3_B$ into video signals, which are applied through the cathode current detectors $4_R$, $4_G$, $4_B$, respectively, to the cathodes $6_R$, $6_G$, $6_B$. The cathode current detectors $4_R$, $4_G$, $4_B$ serve to detect voltages proportional to cathode currents. The detected voltages are allowed by the gates $9_R$, $9_G$, $9_B$ to pass therethrough during the period in which the reference voltage signal is applied in response to the pulse signal delivered from the input terminal 8. The voltages which have passed through the gates are fed back to the cathode voltage controllers $10_R$, $10_G$, $10_B$ as signals for d-c level control. The cathode voltage controllers $10_R$, $10_G$, $10_B$ hold the voltages thus fed back and control the cathode voltages to bring the cathode currents to predetermined levels (normally about 10 $\mu$A) for automatic cathode cutoff-voltage adjustment.

Figure 3:
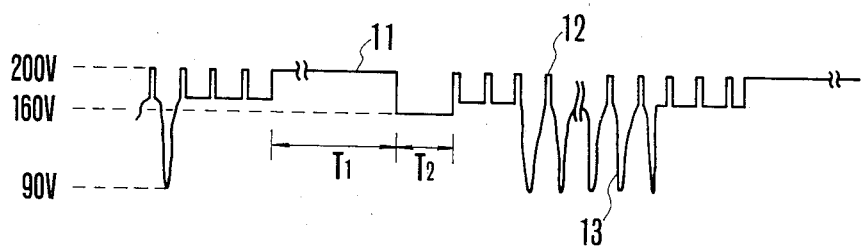
FIG. 3 is a diagram illustrative of a cathode voltage waveform.

FIG. 3 is illustrative of a cathode voltage waveform of one of the video signals to which the reference voltage signal is added. Designated at $T_1$ is the vertical blanking period, and $T_2$ the period in which the reference voltage signal is supplied, the period $T_2$ being formed immediately after the vertical blanking period $T_1$ and during two horizontal deflection periods. The waveform includes a vertical retrace pulse 11, horizontal retrace pulses 12, and a video signal 13. As an example, the pulses have a peak value of 200 V, the reference voltage signal has a peak value of 160 V, and the video signal has a peak value of 90 V.

With the foregoing automatic cutoff adjustment, however, some color picture tubes still suffers from variation in the color mixture ratio and tinting of images which should look white, due to a leakage current flowing from the cathodes to the associated heaters. Such a condition will be described with reference to a red electron gun. The condition also holds true for green and blue electron guns.

Figure 4:
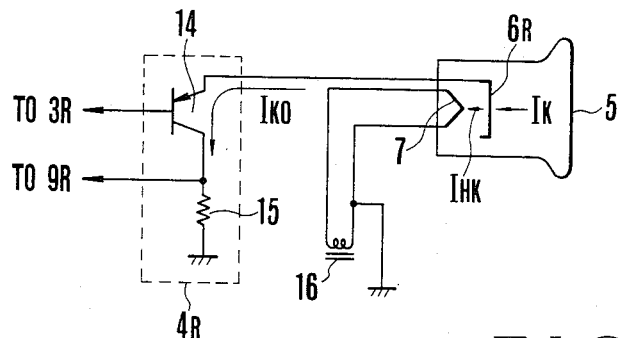
FIG. 4 is a circuit diagram of a cathode current detector and a heater circuit for a color picture tube.

FIG. 4 shows a cathode current detector and a heater circuit. A video signal from the video amplifier $3_R$ is supplied through a transistor 14 to the cathode $6_R$. The cathode current detector $4_R$ includes a load resistor 15 for supplying a voltage to the gate $9_R$, and the transistor 14. The heater 7 is supplied with a current from a heater transformer 16. The color picture tube 5, which comprises a cathode-ray tube, requires that the cathode voltage be larger than a heater biasing voltage, and hence the heater 7 has one terminal grounded. During the period $T_2$ in which the reference voltage signal is applied, a voltage of about 160 V (according to the above example) is applied across the cathode $6_R$ and the heater 7. Although the cathode $6_R$ and the heater 7 are electrically insulated from each other, their insulation is such that a leakage current $I_{HK}$ of from several microamperes to several of tens of microamperes will flow from the cathode $6_R$ to the heater 7 when the voltage is applied thereacross. The leakage current $I_{HK}$ varies with time and from one gun to another. A relationship between a cathode current $I_K$, the leakage current $I_{HK}$, and a current $I_{KO}$ flowing through the cathode current detector $4_R$ can be expressed by the following equation:

$$I_K = I_{HK} + I_{KO}$$

Since the automatic cutoff adjusting circuit operates to maintain the current $I_{KO}$ constant, the cathode current $I_K$ which should be controlled is increased by an amount equal to the leakage current $I_{HK}$. The current $I_{KO}$ is normally about 10 $\mu$A, which is approximately the same as the leakage current $I_{HK}$ that ranges from several microamperes to several tens of microamperes. When the leakage current $I_{HK}$ flows, therefore, the cathode current $I_K$ undegoes an increase equal to the leakage current $I_{HK}$, a condition which shifts the color of the image on the fluorescent screen toward the red. Therefore, no proper color image can be produced. With the leakage current $I_{HK}$ varying with time, the color of the image is shifted to different hues as the leakage current $I_{HK}$ changes.

The present invention has been made in an effort to eliminate the foregoing problems. The invention will now be described with reference to FIGS. 5a through 7d.

FIGS. 5a through 5d show the waveforms of signals generated in a color television receiver according to the present invention. The waveform of FIG. 5a indicates a heater biasing voltage applied to the heater, the waveform of FIG. 5b a cathode voltage for the red gun, the waveform of FIG. 5c a cathode voltage for the green gun, and the waveform of FIG. 5d a cathode voltage for the blue gun. The heater biasing voltage is applied as a pulse of about 160 V for an interval (150 $\mu$s) which includes the period $T_2$ in which the reference voltage signal is applied, and no heater biasing voltage is applied in the rest of the period of 16.7 ms, which is a vertical deflection period. As shown in FIG. 1, the cathode cutoff voltages for the red, green, and blue electron guns differ from each other. The ratio between the maximum and minimum cutoff voltages is known as a cutoff ratio, which serves as one of the specifications of color picture tubes and may be 1.35 at maximum. In the example shown in FIGS. 5a to 5d, the cathode cutoff voltage for the red gun is 184 V, which is the largest, and the cathode cutoff voltage for the blue gun is 136 V, which is the smallest. The illustrated values constitute an upper limit, and the cutoff ratio is $184/136 \approx 1.35$. During the period $T_2$, the voltages across the cathodes and heaters of the red, green, and blue electron guns are 24 V, 0 V, and −24 V, respectively, which are much smaller than those in the conventional color television receivers. The leakage current $I_{HK}$ is substantially eliminated, and no color shifting appers on the color images.

Since the heater biasing voltage is of a relatively small duty cycle as shown in FIG. 5a, its d-c component is substantially nil. The d-c component of the cathode voltage is applied positively at all times with respect to the heater, so that the characteristics of the color picture tube will not be affected adversely. The heater biasing voltage needs to be at a positive level (about 160 V, for example) during the period $T_2$. With pulse width variations in mind, the interval in which the heater biasing voltage is applied should be longer than the period $T_2$ by a margin of 10 $\mu$s at the leading and trailing edges thereof for increased reliability in circuit operation. Where the period $T_2$ is 127 $\mu$s that is constituted by two horizontal deflection periods, the pulse width of the heater biasing voltage is about 150 $\mu$s as shown in FIG. 5a. The pulse width margin at the leading edge (lefthand side as shown) may be longer than the trailing edge margin.

Figure 6:
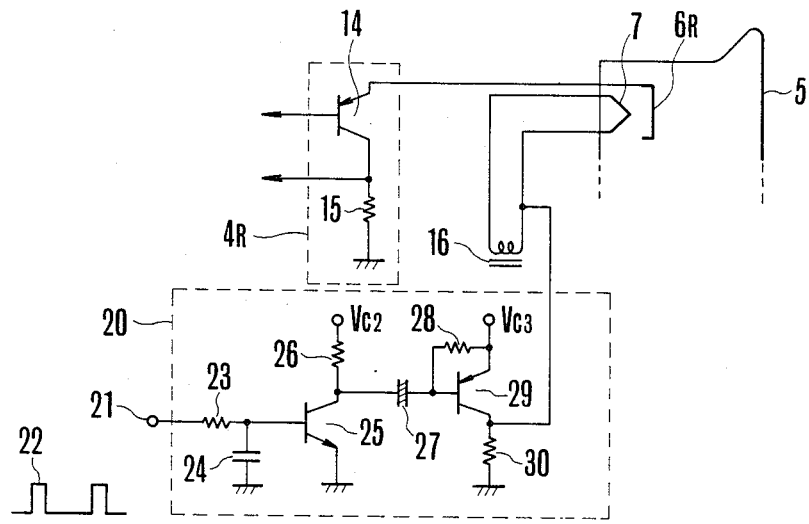
FIG. 6 is a circuit diagram of a portion of a color television receiver according to an embodiment of the present invention.

FIG. 6 shows a circuit for effecting the above operation in accordance with an embodiment of the present invention. Identical parts in FIG. 6 are denoted by idential reference characters in FIG. 4. The circuit, which is generally designated by reference numeral 20, serves as a heater biasing voltage generator. When a vertical retrace pulse 22 is applied to an input terminal 21, the pulse 22 is delivered to an integrator comprising a resistor 23 and a capacitor 24. An integrated output from the integrator is applied to the base of a transistor 25. The signal applied to the transistor base is amplified by the transistor 25 and an amplified signal appears at the collector of the transistor 25 to which a load resistor 26 is connected. A pulse peak detector circuit comprises a capacitor 27, a resistor 28, a transistor 29 having a base connected by the capacitor 27 to the collector of the transistor 25 and an emitter connected by the resistor 28 to the base of the transistor 29, and a load resistor 30 connected to the collector of the transistor 29. The collector of the transistor 29 is coupled to one terminal of the heater 7 for applying a positive heater biasing voltage that has been developed across the load resistor 30 to the heater 7. The heater biasing voltage thus applied is in the form of a pulse with its timing and peak value properly controlled.

Figure 7A:
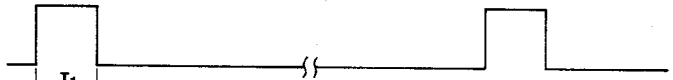
FIGS. 7a through 7d are timing charts for signals produced in the circuit shown in FIG. 6.
Figure 7B:
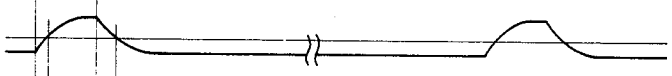
Figure 7C:
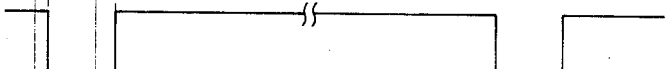
Figure 7D:
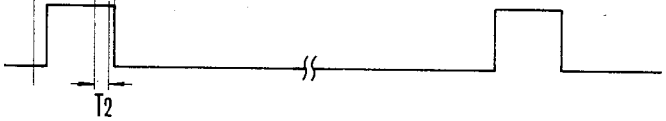

FIGS. 7a to 7d are timing charts for the waveforms of various signals. The vertical retrace pulse 22 applied to the input terminal 21 has a waveform as shown in FIG. 7a. The voltage imposed on the base of the transistor 25 has a waveform as shown in FIG. 7b. A waveform as shown in FIG. 7c is of the voltage at the collector of the transistor 25. The voltage at the collector of the transistor 29, that is, the heater biasing voltage has a waveform as shown in FIG. 7d.

Although the foregoing description has been directed to the red electron gun, it is also effective for the green and blue electron guns.

It should also be appreciated that the heater biasing voltage generator as shown in FIG. 6 is for illustration only and various modifications thereof may be conceivable.

With the color television receiver thus constructed, a positive voltage is applied to each of the heaters in electron guns of a color picture tube during an interval in which a cathode current is detected by an automatic cutoff adjusting circuit, so that the potential difference between each cathode and corresponding one of the heaters can be reduced to lower a leakage current flowing from the cathode to the heater. Therefore, images which are properly colored can be produced at all times on the fluorescent screen of the color picture tube.

While a certain preferred embodiment has been shown and described, it should be understood that various changes and modifications may be made therein without departing from the scope of the appended claims.

What is claimed is:

1. A color television receiver comprising:
   a color picture tube having electron guns including cathodes and heaters therefor, respectively;
   an automatic cutoff adjusting circuit for adding a reference voltage signal substantially at a black level to a luminance signal during an interval beginning substantially at the end of a vertical blanking period and ending prior to the video portion of the vertical deflection period, and for detecting cathode currents flowing toward said cathodes during said interval to control cathode voltages applied to said cathode for keeping said cathode currents at a predetermined level by way of feedback of voltages proportional to said cathode current; and
   a circuit for applying a positive biasing voltage to each of said heaters during said interval to allow a potential difference between said each heater and a corresponding one of said cathodes to limit at least a current flowing from said cathode to said heater.

2. A color television receiver according to claim 1, wherein said last-mentioned circuit comprises an integrator receptive of a vertical retrace pulse, an amplifier for amplifying an output from said integrator, and a pulse peak detector responsive to an amplified output from said amplifier for applying the positive biasing voltage to said heater.

3. A color television receiver according to claim 2, wherein said amplifier comprises a first transistor having a first base connencted to said integrator and a first collector and a first load resistor connected to said first collector, and said pulse peak detector comprises a second transistor including a second base connected through a capacitor to said first collector, an emitter connected through a resistor to said second base, and a second collector connected to a second load resistor and to said heater.

\* \* \* \* \*